(12) United States Patent
Nikander et al.

(10) Patent No.: US 7,535,870 B2
(45) Date of Patent: May 19, 2009

(54) IP MOBILITY

(75) Inventors: Pekka Nikander, Jorvas (FI); Jari Arkko, Kauniainen (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 281 days.

(21) Appl. No.: 10/558,498

(22) PCT Filed: Mar. 22, 2004

(86) PCT No.: PCT/EP2004/050342

§ 371 (c)(1),
(2), (4) Date: Aug. 23, 2006

(87) PCT Pub. No.: WO2004/107702

PCT Pub. Date: Dec. 9, 2004

(65) Prior Publication Data

US 2006/0274693 A1 Dec. 7, 2006

(30) Foreign Application Priority Data

Jun. 3, 2003 (GB) ................................ 0312681.0

(51) Int. Cl.
*H04Q 7/00* (2006.01)

(52) U.S. Cl. ........................ 370/331; 455/436; 455/442; 455/415

(58) Field of Classification Search ................. 370/331; 455/436, 442, 415
See application file for complete search history.

(56) References Cited

U.S. PATENT DOCUMENTS

2003/0018810 A1 1/2003 Soliman et al.
2003/0211842 A1* 11/2003 Kempf et al. ................ 455/411
2003/0225892 A1* 12/2003 Takusagawa et al. ......... 709/227

* cited by examiner

*Primary Examiner*—Nghi H Ly

(57) ABSTRACT

A method of forwarding IP packets, sent to an old care-of-address of a mobile node, to the mobile node following a handover of the mobile node from a first old access router to a second new access router. The method comprises, prior to completion of said handover, providing said first router or another proxy node with information necessary to determine the new IP care-of-address to be used by the mobile node when the mobile node is transferred to the second access router. At said first router or said proxy node, the new care-of-address for the mobile node is determined using said information and ownership of the new care-of-address by the mobile node confirmed, and subsequently packets received at said first access network and destined for said old care-of-address are forwarded to the predicted care-of-address address.

33 Claims, 3 Drawing Sheets

| IPv6 header | AH header | ICMPv6 header | New message Specific data | ICPM message options |

| Type | Code | Checksum |
| Identifier | | Reserved |
| Options..... | | |

Figure 5

IP MOBILITY

FIELD OF THE INVENTION

The present invention relates to fast handover mechanisms for mobile terminals within a packet switched access network

BACKGROUND TO THE INVENTION

In the Mobile IPv6 protocol (standardised by the IETF), a roaming mobile node is responsible for informing its home agent and correspondent nodes of its current care-of-address. Whenever a mobile node changes its care-of-address, it sends a Binding Update message to its home agent, performs a Return Routability procedure with the correspondent nodes, and finally sends Binding Updates to the correspondent nodes. During the time when the mobile node has already moved but the bindings have not been updated, packets destined for the mobile node continue to be delivered to the old care-of-address and are lost by default.

In a typical situation, the mobile node, the home agent and/or (at least some of) the correspondent nodes may be far from each other, e.g. on different continents. Consequently, the communication latency between the nodes may be high, typically at least tens of milliseconds and often in the order of 100 ms or more. Due to the Return Routability procedure, it takes 1.5 round trip times to update the binding at the correspondent nodes, and at least 0.5 round trip time to update the binding at the home agent. Given these latencies, the delay in updating the bindings can be up to a few hundreds milliseconds or even longer. While such a delay and packet loss may well be acceptable to some applications, it is clearly unacceptable to others such as conversational multimedia and other real time applications.

To overcome the packet loss problem, it is possible to forward the packets destined for the old care-of-address to the new care-of-address. This function can be performed by the previous default router of the mobile node. One possible way of setting up the forwarding procedure is specified by the IETF mobileIP Working Group [Koodli, R., "Fast Handovers for Mobile IPv6", draft-ietf-mobileip-fast-mipv6-06 (work in progress), March 2003]. Packet forwarding can be set up before the handover occurs, but only if the mobile node knows the identity of the new access muter and is able to pass a corresponding identifier to the previous default router. Otherwise the forwarding must be set up after handover and that is likely to result in some packet loss.

Any solution to this problem must be secure and simple. State creation should be avoided where ever possible as, among other disadvantages, creating states at the network is always a potential security risk. Any solution must also be scalable. Explicit security infrastructures, such as AAA or PKI should be avoided, since these are likely to create scalability bottlenecks.

SUMMARY OF THE PRESENT INVENTION

According to a first aspect of the present invention there is provided a method of forwarding IP packets, sent to an old care-of-address of a mobile node, to the mobile node following a handover of the mobile node from a first old access router to a second new access router, the method comprising:
  prior to completion of said handover, providing said first router or another proxy node with information necessary to determine the new IP care-of-address to be used by the mobile node when the mobile node is transferred to the second access router,
  at said first router or said proxy node, determining the new care-of-address for the mobile node using said information, and confirming ownership of the new care-of-address by the mobile node; and
  subsequently forwarding packets received at said first access network and destined for said old care-of-address, to the predicted care-of-address address.

Where a proxy node is involved, this may act as an Internet Protocol level proxy for the mobile node, causing said first access router to believe that the mobile node has not yet moved.

Preferably, said step of determining a new care-of-address for the mobile node comprises predicting that address on the basis of one or more components. Said step of predicting the new care-of-address is carried out in response to the mobile node notifying the first router or proxy node that it has moved or is about to move, the mobile node sending the notification to the first access router from the link attached to the old access router. Alternatively, the mobile node may send the notification to the first access router from the link attached to the second access router.

The first access router or proxy node may confirm the timeliness of said notification prior to forwarding packets to the new care-of-address. This comprises determining the timeliness of said notification using a nonce periodically sent by the first access router and echoed back in the notification.

The method may comprise queuing, at the second access router, IP packets forwarded from the first access router until the mobile node appears on the new link and the necessary address resolution and other procedures have been completed to ensure that the second access router and the mobile node can exchange packets.

The method may comprise queuing, at the first access router, packets destined to the mobile node's old care-of-address until the first access router is able to determine the new care-of-address of the mobile node.

A queue may be established for the mobile node at an access router depending upon the trust relationship existing between that access router and the other access router and/or the mobile node. The maximum size of the queue depends upon said trust relationship(s).

The step of predicting the new care-of-address may be probabilistic and may fail.

The step of predicting the new care-of-address may comprise applying a procedure which is known and understood by mobile nodes and access routers. This procedure uses cryptographically generated addresses. More particularly, the procedure may make use of certificates.

The step of determining a new care-of-address may comprise using the public key of a public-private key pair belonging to the mobile node to generate the new care-of-address, and said step of confirming ownership of the new care-of-address by the mobile node comprises generating a signed message at the mobile node with the private key, and sending that signed message to the first access router.

The new care-of-address may be one of a plurality of care-of-addresses predicted by the first access router, the first access router forwarding packets to each of the predicted care-of-addresses.

The method may comprise, following the prediction of the new care-of-address by the first router or the proxy node, sending a tunnel set-up request from the first router to the second router, and subsequently forwarding packets through the established tunnel.

The second access router may verify the relevance of tunnel set-up requests by periodically sending a nonce to listening mobile nodes, said mobile node hearing this nonce when it scans for a new link and including it in its notification to the first access router, the first access router including the nonce in the tunnel set-up message.

According to a second aspect of the present invention there is provided an access router for use in a packet switched access network and comprising:

means for determining a future care-of-address for a mobile terminal currently or recently attached to the access router and for confirming ownership of the new care-of-address by the mobile node;

means for forwarding packets sent to the mobile terminal at a care-of-address associated with the access router, to said care-of address.

The access router may comprise means for establishing a tunnel between the access router and a second access router associated with the predicted future care-of-address.

According to a third aspect of the present invention there is provided a mobile node for use in the above first aspect of the invention and comprising means for notifying the first access router that the mobile node has, or is about to, transfer to a new access router.

According to a fourth aspect of the present invention there is provided a method of forwarding IP packets, sent to an old care-of-address of a mobile node, to the mobile node following a handover of the mobile node from a first old access router to a second new access router, the method comprising:

prior to completion of said handover, providing said first router or another proxy node with information necessary to predict the new IP care-of-address to be used by the mobile node when the mobile node is transferred to the second access router;

at said first router or said proxy node, predicting the new care-of-address for the mobile node using said information; and subsequently forwarding packets received at said first access network and destined for said old care-of-address, to the predicted care-of-address address.

BRIEF DESCRIPTION OF THE DRAWINGS

FIG. 4 illustrates the structure of a new ICMP (tunnel creation) message;

FIG. 5 illustrates the contents of the ICMP message of FIG. 4;

DETAILED DESCRIPTION OF CERTAIN EMBODIMENTS

Figure 1:
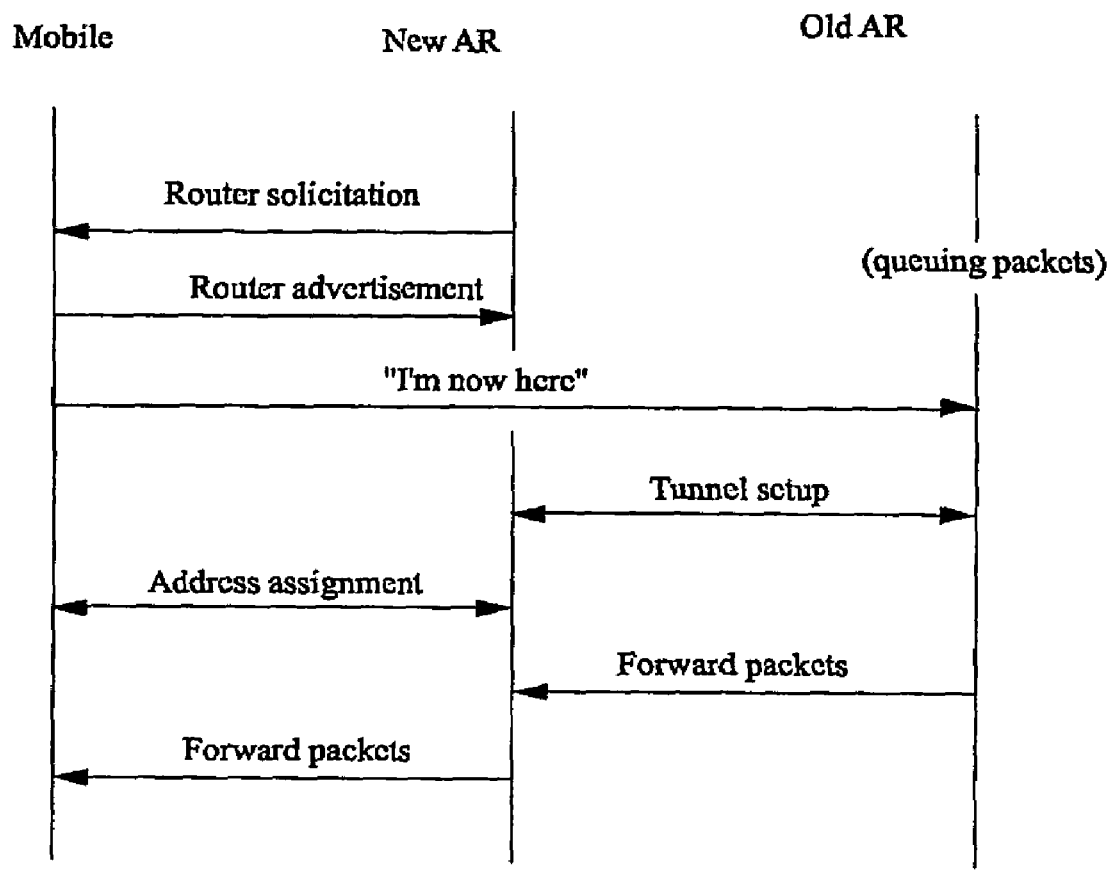
FIG. 1 illustrates signalling associated with a first embodiment of the invention.

The procedure presented here provides a new method for setting up forwarding from an old care-of-address to a new care-of-address for a mobile node roaming in a visited network. In an example scenario, the mobile node is a wireless mobile terminal and the visited network is a packet switched access network of a cellular telephone system. The access network comprises a number of access nodes to which the mobile node may attach. The owner/user of the mobile terminal is a subscriber of some other "home" network. The handover method presented here is superior to the previously presented methods in terms of security and message efficiency. Specifically, setting up the forwarding between the mobile node and an old access router can be accomplished with as little as one message. With additional assumptions about the network, it is sometimes even possible to set up the forwarding without any extra messages between the mobile node and the access routers.

It should be noted that, even though this document is written with Mobile IPv6 optimisation in mind, the procedure presented is by no means limited to Mobile IPv6. It is applicable to any IP mobility technique which is based on a mechanism where the mobile node informs its peers about changes in its addresses.

The procedure for achieving fast handover relies upon a few simplifying assumptions. These assumptions allow the necessary state to be set up with fewer messages and better security than the previous methods have been able to achieve. These assumptions are realistic in practical environments. Additionally, variations of the procedure are also presented for which the assumptions are lifted though with some loss of efficiency.

The first assumption which is made is that the mobile node is able to anticipate, with a high probability, the new care-of-address that it is likely to use with a new access router following handover. In the unlikely case that the address anticipation fails, a few packets may be sent to a wrong destination host, but the packets will be dropped by the recipient. In the principal mechanism described here, referred to below as the "base" mechanism, a new access router involved in a handover procedure assumes that the old access router does not send any unnecessary traffic to it. Note that routers already assume that hosts in the Internet do not send packets to non-existent nodes or send unnecessary packets. However, one way to ensure that this assumption holds is to ensure that the two routers belong to the same administrative domain, and that the network performs source address filtering so that it is not possible to send packets with a "spoofed" source address so that they appear to come from an old access router. In any case, the potential negative effects of this assumption failing are relatively benign; routers are already expected to be able to prioritise their use of resources to protect themselves against resource depletion. Additionally, a variation of the proposed mechanism offers heuristic and cryptographic means to distinguish bogus traffic from legitimate traffic. This is described in more detail below.

To reach the goal of preventing unnecessary packet loss during and after the handover of a mobile node between access routers, it is necessary to set up a mechanism whereby packets destined to the old care-of-address are passed to the new care-of-address. To do so, a forwarding tunnel is established from the old access router to the new care-of-address, thereby forwarding the packets to the new location of the mobile node. The forwarding tunnel has a limited lifetime, although the mobile node can explicitly request an extended lifetime for the tunnel if needed. It is important to note that, while one of the tunnel end-points is located at the old access router, the other end-point is not located at the new access router but within the mobile host itself, at its new care-of-address.

There are two main variants of the fast handover procedure. In the "proactive" case, the forwarding tunnel is set up before the mobile node moves away from the old link. In the "reactive" case, the forwarding tunnel is created once the mobile node has arrived at the new link and is able to use its new care-of-address. The forwarding tunnel is essentially an optimisation and is thereby a "soft state". If needed, the old access router is free to drop the tunnel at any time, even before the tunnel lifetime expires. This may result in packet loss, but it may be acceptable in a given situation.

Once the mobile node has completed its movement to the new link the tunnel may be used in both directions. This allows the mobile node to send packets using the old care-of-address during the time it takes to update the bindings. The new access router does not need to be aware of the forwarding tunnel. All that it sees are packets sent by the old access router to the mobile node at the new care-of-address, and packets sent by the mobile node from the new care-of-address to the old access router.

Reactive Forwarding

In the reactive forwarding case, the old access router may queue some packets sent to the old care-of-address in the hope that the mobile node will come back or will subsequently set up the forwarding tunnel. Such a forwarding mechanism is subject to local policy, and may be triggered simply by the mobile node leaving the old link. The signalling associate with the reactive forwarding case is illustrated in FIG. 1. However, it should be noted that the order of the messages is not necessarily as shown. For example, the "I'm now here" message could be sent after address assignment message. Also, the Tunnel setup message may not be needed, and tunneling is achieved using neighbour discovery as explained elsewhere in the text. It is further noted that the Address assignment process will typically consist of multiple, and may be carried out at a different point in the overall signalling scheme. Packet forwarding can start either immediately after the receipt at the new AR of the "I'm now here" message, or later. Forwarding may go via the new AR or be directly addressed to the mobile node. In the latter case the new AR will buffer the packets until address assignment is complete.

Proactive Forwarding

In the proactive forwarding case, in order to avoid packet loss at the new access router, it may be required that the new access router queues a few packets before the mobile node is ready to receive packets at the new care-of-address. However, this queuing problem is considered to be architecturally separate from the forwarding problem. As explained above, the new access router does not need to create any state even when forwarding is used. On the other hand, queuing itself creates a state. At first it may appear that it would be necessary for the old access router to explicitly ask the new access router to queue up the forwarded packets. However, under closer inspection such signalling appears to be completely unnecessary. As has already been stated, it is assumed that the new access router trusts that the old access router will not send any packets unnecessarily. Based on this assumption, an implicit agreement can be created between the access routers. The new access router assumes that if the old access router sends to it packets that are destined to an unknown node, then the old access router has a reason to expect that that node will arrive at the new access link shortly. Consequently, the new access router can safely queue the packets for a while, space and other resources permitting. Signalling does not help here. If the new access router has resources, it can easily queue packets, even if it has not received a request to do so. On the other hand, if the new access router does not have enough of resources, it cannot queue the packets even if the old access router has requested it to do so.

If the new access router does not know or trust the old access router, the situation becomes slightly more complicated. If there is no relationship at all between the old and new access router, the case becomes basically the same as above: either the new access router is able to queue up the unknown packets or it is not. A signalling message from the unknown and distrusted old access router does not help, since it could be forged. A more challenging situation is the case where the new access router does not initially have any reason to trust the old access router, but there is a third party, trusted by the new access router, who is able to vouch for the old access router. However, even here it is unnecessary to inform the new access router about each mobile host separately. Signalling does not add any resources to the new access router. Thus, if signalling is needed to create a trust relationship between the routers in the first place, this signalling is best kept separate from the actual queuing of the packets.

Trust Relationships

There are three parties involved in the base protocol; the mobile node, the old access router, and the new access router. By necessity, the mobile node must trust the access routers to provide routing services. That is, it must trust that the routers correctly pass packets between the mobile node and its peers. Additionally, most probably the mobile node should, or at least can trust that the routers do not deliberately launch attacks against it. Furthermore, before setting up the forwarding tunnel, the mobile node must decide to trust that the old access router will perform forwarding correctly. In a real situation, the mobile node will probably authenticate the access routers before it decides to trust them. However, such mechanisms fall outside the scope of this document.

The new access router must trust, to an extent, that the old access router does not unnecessarily send packets that are destined to nodes that are not (yet) on the link. This trust may be manifested in the amount of space and resources that the new access router is ready do devote to queuing packets. Since potential old access routers may fall into classes of varying trustworthiness, the new access router may reserve different amount of resources for each class. For example, it may be willing to queue packets from nodes that appear to be in the same subnet as itself, but refuse to queue packets sent by any other nodes.

The access routers should not trust the mobile nodes. The access routers must assume that the mobile node may try to launch various kinds of attacks against them or other mobile nodes. On the other hand, the access routers are considered to be obliged to provide services to the mobile node. That is, even though the access routers do not trust the mobile node, they must still be willing to route packets to and from the mobile node. Additionally, the old access router should be willing, for a limited time at least, to forward packets on behalf of a mobile node that recently left the link.

In the proactive case, it is further assumed that the mobile node trusts the old access router to correctly create the forwarding tunnel based only on the identifier of the new access router.

Additionally, the mobile node needs to be able to trust that the old access router will not start forwarding packets before the mobile node actually detaches from the link.

In the base protocol, the nodes are assumed not to trust anyone else in the network. On the other hand, some variations assume a trusted third party.

It is assumed that the mobile node learns some notion of time from the old access router while still at the old link. This allows it to bind the forwarding tunnel creation message with the access router's notion of time, thereby countering replay attacks. There is no need to assume synchronized clocks between any of the parties.

Potential Threats

Since the mechanism creates states at the access routers upon the request of an distrusted mobile node, the mechanism is vulnerable to unauthorized creation of states. Additionally, the mechanism may open new denial of service possibilities. In this section we briefly analyse the identified threats.

Address Stealing

If an attacker is able to create an unauthorized forwarding tunnel at an access router, it can effectively tunnel all packets either to itself or to a black hole. This is similar to the Mobile IPv6 basic address stealing attack and has similar consequences with respect to integrity and secrecy. The attack works against any nodes that use the vulnerable access router for their network access.

Future Address Stealing

If an attacker is able to anticipate the care-of-address that a mobile node is likely to use on a link, and if it can attach to the link using that particular address, it can use the address for a while, move away, and request the address to be forwarded. Such a request would be authorized since the attacker was legally using the very address. When the victim later comes to the link, it will not get any packets since its address is forwarded away.

Unauthorized Forwarding Tunnel Breakdown

The future address stealing vulnerability cannot be mitigated by simply saying that an active node on a link always overrides a forwarding tunnel. Such a practise would allow an attacker to start using a mobile node's address just after the mobile node has moved away, thereby breaking the forwarding tunnel.

Creating a Forwarding Tunnel to a Bogus End

An attacker may be able to create a forwarding tunnel whose endpoint is a location where the attacker has no intention to move to. If there is a queuing new access router at that location, this attack will consume queuing resources on the new access router.

Flooding with Tunnel Creation

If an attacker is able to set up a large number of forwarding tunnels at the same time, all directed to the same care-of-address or to a single network, an attacker may be able to flood the target with a large amount of packets. The attacker itself does not need to be involved in the traffic after the initial setup, since the packets will be sent by various servers the attacker has contacted before setting up the forwarding tunnels. This is similar to the Mobile IPv6 flooding attacks.

Replaying Tunnel Creation

If an attacker is able to record a forwarding setup message and later replay it when the mobile node is back at the link, the attacker can "blackhole" the traffic. This results in denial-of-service.

Exhausting Queuing Resources at New Access Router

The new access router may want to queue forwarded packets arriving before the mobile node arrives. The router has only a limited amount of resources available for storing such packets. If an attacker can make the new access router unnecessarily queue packets, this may require so much resources that the router cannot queue packets destined to a legitimate mobile node. Thus, it is desirable that the new access router can somehow make a distinction between legitimately forwarded packets that need to be queued and random packets that need not be queued.

Exhausting Queuing Resources at Old Access Router

The old access router may want to queue up packets destined to a mobile node that has moved away but that has not yet set up a forwarding tunnel to its new location. As with the new access router case, there is only a limited amount of memory available for storing such packets. If an attacker can force the access router to unnecessarily store packets that are never going to be delivered to the new location of a mobile node, this will tie up resources. Thus, it is desirable that the old access router can somehow make a distinction between packets that are likely to be sent to a mobile node and those that are not.

Solutions

The base solution consist of two parts. The first part takes care of the creation of the forwarding tunnel from the old access router to the new location of the mobile node. The second part addresses queuing of packets at access routers. The solution is based on an agreement on the care-of-addresses. That is, the mobile nodes are not allowed to freely use any care-of-address that they might want to use. Instead, the mobile node and access routers must agree on the care-of-addresses that the mobile node is to use, or at least is likely to use. The exact agreement depends on the applied security solution. The base protocol uses Cryptographically Generated IPv6 Addresses [Aura, T., "Cryptographically Generated Addresses (CGA)", May 2003.].

The present solution is characterised by only minimal state requirements. Before the mobile node requests that a forwarding tunnel be established, neither of the access routers need to have any per-node state, other than those they have for other purposes. For example, the old access router must, naturally, keep state information about the mobile nodes it is serving. This state information is typically kept only for a short while after a mobile node has left the link, and state may be utilized in controlling both forwarding setup and packet queuing. However, such state is not necessary, and the forwarding tunnel can still be securely created even without such state.

The new access router does not have and need not have any state before the mobile node actually arrives on the link and acquires a care-of-address. Even after that, the only explicit state needed is the natural state that the new access router has to keep for each mobile node for other purposes.

It is important to notice that the state requirements are slightly different for forwarding setup and packet queuing. For the forwarding setup, all the a priori state information may be stored on the mobile node. For packet queuing on the other hand, the old access router may need to keep state information about the nodes that it has recently served but does not serve any more.

Figure 2:
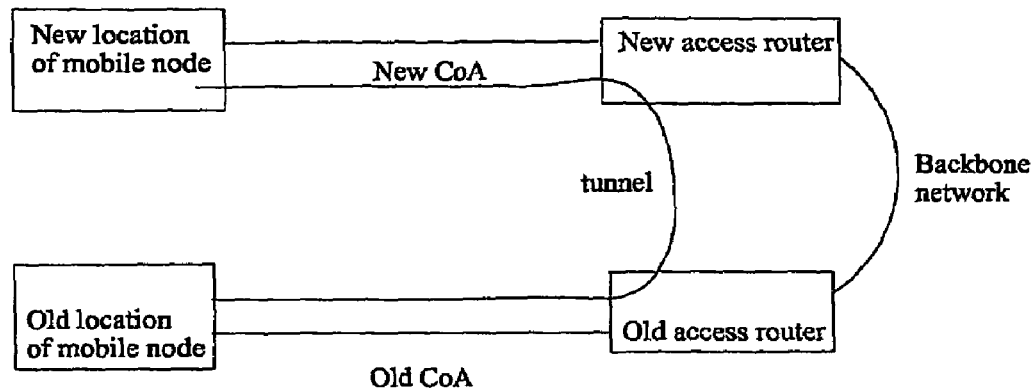
FIG. 2 illustrates a packet forwarding tunnel from an old to a new access router.
Figure 3:
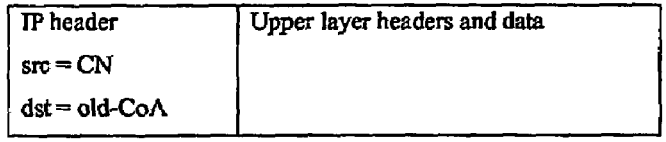
FIG. 3 illustrates the structure of an IP packet before and during forwarding via the tunnel of FIG. 2.
Figure 3:
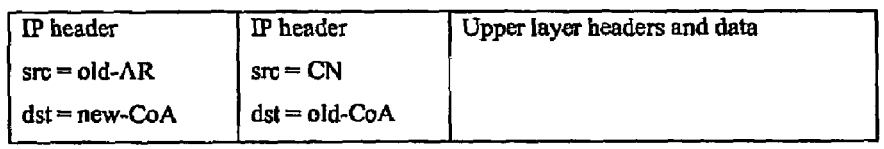

To prevent packet loss, the packets sent to the old care-of-address are forwarded to the new care-of-address. To accomplish this, a forwarding tunnel is created from the old access router to the new location of the mobile node. The resulting tunnel is depicted in FIG. 2. The tunnel is created between the old access router and the mobile node at the new location. That is, the outer IP header has the new care-of-address as its destination address and the old access router address as its source address. Respectively, the tunnel state is located at the mobile node and the old access router, the new access router may remain unaware of the existence of the tunnel. FIG. 3 illustrates the IP packet format before forwarding (top) and during forwarding (below).

In the proactive case, the tunnel is logically created before the mobile node arrives at the new location. In that case (some of) the packets will queue at the new access router until the mobile node arrives at the new location. As already discussed, this does not impose any need for having explicit per-node state at the new access router.

The two end-points of the tunnel can be created separately. The end-point at the old access router is created on the request of the mobile node. The other end point is created as soon as the mobile node knows, for certain, its new care-of-address. It must be noted that in some scenarios the old access router knows the forthcoming new care-of-address before the mobile node knows it. This is possible if, for example, the care-of-address is determined algorithmically, as explained below.

In the base protocol, the care-of-addresses are always CGA addresses [Nikander, P., "Denial-of-Service, Address Ownership, and Early Authentication in the IPv6 World", Security Protocols 9th International Workshop, Cambridge, UK, Apr. 25-27, 2001, LNCS 2467, pages 12-26, Springer, 2002]. The basic idea is that the interface identifier part of the IPv6 address is created by taking a cryptographic hash over the routing prefix and the public key of the mobile node. The details are defined in [Aura, T, "Cryptographically Generated Addresses (CGA)", May 2003], and it is unnecessary to repeat them here.

This construction has three important consequences:

The addresses are randomly distributed, and if any of the hash inputs are missing, it is hard to predict what the address will be.

Given a routing prefix, the public key, and the other parameters, any node can easily construct the most likely address.

Given an address, public key, and the other parameters, a node can verify that the public key is associated with the address with a high probability. In other words, given an address, it is hard to construct another public key that gives the same address at the same link. Furthermore, given any public key, it is even harder to construct a different public key that gives the same addresses (as the given one) on two separate links.

It is noteworthy that without any knowledge about the public key, the addresses appear to be virtually random, and reveal no information about the identity of the node. If the same interface identifier is kept for a long time, this may, however, help determine the identity of the mobile node and track its movements. To counteract this potential problem, the mobile node may periodically change its public key or other parameters used as input for the interface identifier generation.

The mobile node can request that the old access router create the forwarding tunnel either proactively, before it changes location, or reactively, after having changed location. There also exists a special case, discussed further below, where the old access router can even create the forwarding tunnel autonomously.

Proactive operation is not always possible. It is only possible if
1. The mobile node can predict that it will (probably) move, and
2. The mobile node can identify the (likely) new access router.

Additionally, it is useful if the old access router can detect the moment when the mobile node actually moves away, and activates the requested tunnel only then.

To be able to securely create the tunnel end-point, the old access router must know the following:
1. The old care-of-address of the mobile node.
2. The (likely) new care-of-address of the mobile node.
3. No other node is likely to be present at the new care-of-address.
4. The mobile node is or was recently present at the old link, using the old care-of-address.

The first three properties can be easily established with CGA addresses. However, the fourth point requires timeliness, and therefore either state, timestamps, or nonces are needed. To avoid problems with time synchronization, we avoid timestamps. The base protocol uses nonces; it is later defined how state can be used to augment the protection provided by nonces.

To reduce state requirements and protect against replay attacks, the access routers periodically broadcast a nonce to the local link. The nonce is changed every few seconds. The access router must remember the current nonce and at least one previous nonce. The exact algorithm used for nonce generation is a local matter to the access router. However, given any history of nonces, it must be cryptographically hard to predict future nonces.

To request a forwarding tunnel, the mobile node sends a message to the old access router. The message must contain the following data.

Identity of the old access router, in some form.
Identity of the new access router, in some form.
A recent nonce, as received from the old access router.
Old care-of-address, for CGA verification.
Public key, CGA parameters and Signature The old access router performs the following operations:

It checks that the packet correctly identifies the old access router.
It checks that nonce is sufficiently fresh.
It checks that the old care-of-address has the correct routing prefix used on the link served by the old access router.
It checks that the old care-of-address corresponds with the given public key and CGA parameters.
It verifies of the signature.

After this procedure, the old access router knows the following:

The sender of the packet was recently at the local link (or at least was able to receive the nonce that the old access router broadcast on the local link), as the nonce is fresh.
The sender of the packet, identified by the public key, used the given old care-of-address while it was at the local link (with high probability, given that the sender was at the local link in the first place). The probability that someone else was using the address or is currently using the address is very small. However, if it appears that someone else is using the address right now, the tunnel cannot be set up. (This is a cost imposed by the probabilistic nature of the scheme. However, the probability of such a collision is almost negligible, and it is impossible, for all practical purposes, for an attacker to simulate such a collision.)
No-one else but a node knowing the private key corresponding to the given public key could have sent the packet, since the signature has been verified (and the nonce is covered by the signature).
The sender of the packet is likely (or at least claims) to be accessible now (or soon) at the given new access router.

Given the information in the packet and the knowledge established through the verification process, the old access router can now proceed to establish the forwarding tunnel. To do so, it must first derive the (likely) new care-of-address of the mobile node as follows:

Given the new access router identifier carried in the message, the old access router determines the routing prefix for nodes in the new link. The exact method how the old access router determines the routing prefix falls beyond the scope of this document.
Given the public key, CGA parameters and the new routing prefix, the old access router computes the new interface identifier, as discussed above.
Concatenating the routing prefix and the interface identifier gives the new (likely) care-of-address.
At this point the old access router knows both the old and new care-of-addresses of the mobile node, and it can set up the forwarding tunnel. In the base scheme, the tunnel is just set up, implicitly. The tunnel will automatically expire after a preset period of time. In some of the variations described later in this document, the old access router sends an acknowledgement message.

It should be noted that there are no fundamental differences between the proactive and reactive cases. In both cases the mobile node sends essentially same information to the old access router. However, there may be practical differences.

Once the mobile node arrives at the new link and is able to acquire a new care-of-address, is must be ready to receive forwarded packets. Since it has its own old care-of-address and the address of the old access router, it has all information needed and can start unwrapping suitably tunnelled packets. As discussed below, it is very unlikely that any possibly existing node would be willing to unwrap these packets, even if there was an address collision.

Since the old access router may create the new care-of-address already before the mobile node has arrived at the new link, it is possible that the new care-of-address is not available. That is, it is possible that some other node is already using the given address as the mobile node arrives at the new link. However, such an event is very unlikely. For practical purposes, CGA addresses are distributed evenly and randomly over $2^{59}$ different values. Thus, given a link with k nodes already on the link, the probability that an arriving node would get an available address is $(1-2^{-59})^k$, which is slightly greater than $1-k*2^{59}$ for all practical values of k. Conversely, the probability of collision is less than $k*2^{59}$. For example, for a link with about 65,000 or $2^{16}$ nodes, the probability of collision is less than $2^{16}*2^{-59}=2^{-43}=1.137*10^{-13}$. If the new access router is serving $2^{16}$ nodes at all times, and there arrives a new node every 1 second (and one old node leaves, respectively), it will take more than 250,000 years before there is likely to have been one collision. Thus, address collisions will be very rare events.

The CGA specification defines a method by which the mobile node is able to acquire another care-of-address if the default choice is already taken up. However, if the old access router has set up the forwarding tunnel either proactively or autonomously, the forwarded packets are passed to a wrong node. Fortunately, this node is likely to drop the packets with a probability greater than $1-2^{59}$, since the probability that the receiving nodes old care-of-address and the arriving node's old care-of-address would collide not only requires that both of the nodes have arrived from the same link but also that they had the same care-of-address at that old link. Thus, in practice, an address collision at the new link is a very rare event. In the event that it happens, the only practical consequence is that the forwarded packets will be dropped.

The new access router creates a neighbour cache entry for the mobile node when it arrives. Thus, in the proactive or autonomous forwarding setup case, if a forwarded packet arrives at the new access router before the mobile node has arrived, the new access router simply notices that it has received a packet destined to an address for which it has no neighbour cache entry. In the reactive case, there may be packets arriving at the old care-of-address before the forwarding tunnel has been set up. In both cases, it is desirable to queue the packets for a limited time, and forward the packets as soon as possible. Also, in both cases, the volume of queued packets is strictly bound by the amount of resources available at the access routers. This volume is likely to be hardware bounded, and therefore it cannot be dynamically varied. Thus, the problem to solve in managing queuing is to make sure that no packets are unnecessarily queued. Once this has been taken care of, there is no further need to differentiate between queued packets, unless explicit QoS classes are used.

The old access router may start to queue packets once it realises that a node has left the link but not established a forwarding tunnel. It should queue these packets only for a limited time. The queuing time should be varied according to the amount of available memory and the amount of packets to be queued. The actual queue management algorithm is a local matter. The queued packets can be forwarded either if the node returns to the link or if the node establishes a forwarding tunnel.

The old access router may notice that a node has left the link through link layer notification, through IPv6 Neighbour Unreachability Detection (NUD) failure, or through some other means. All of these situations are characterised by the old access router having a neighbour cache entry for the old care-of-address, and an event signalling the inability to actually pass packets to the mobile node.

The new access router may start to queue packets if it starts receiving tunnelled packets to an address that is not currently in its neighbour cache. In such a case the packets are likely to be destined to a mobile node that has not yet arrived to the link but that will probably arrive and start using the address as its care-of-address. If the new access router has enough available resources, it may queue all received but undeliverable packets for a while. However, such practice is vulnerable to a denial-of-service attack where an attacker, perhaps using spoofed source addresses, attempts to fill the available memory with packets that will never be delivered. Thus, the new access router should classify queued packets based on the probability that they have actually been sent by a trusted old access router.

There are multiple ways in which the new access router can classify the packets. At least the following possibilities are available:

- The new access router may decide to give priority to packets containing a tunnel header.
- The new access router may check the source address in the tunnel header, and give priority to a packet if the source address belongs to a known old access router. This method may be strengthened if it possible to structure the network in such a way that it is impossible for outsiders to send IP packets that contain a spoofed source address belonging to an old access router.
- If the new access router and the known old access routers share IPSec security associations, the new access router may give priority to packets that are protected using such a security association.
- Before starting to send tunnelled packets, the old access router may forward the forwarding setup message it has received, and the new access router may verify this message, as explained below, and create a tentative "future" neighbour cache entry. It may then give priority to destination addresses that have such a tentative "future" neighbour cache entry.

At the first sight it seems desirable to have explicit knowledge of the mobile nodes that are likely to arrive at the link in the near future. We now define one method that allows the new access router to set up such a state.

Once the old access router has performed its check on a forwarding setup message, it can pass forward the message to the new access router. If it does so, it should forward the packet first and start passing tunnelled packets only afterwards. When the new access router receives such a passed forwarding setup message, it should verify the message as follows:

Check that the message has been sent by a known old access router, e.g., based on the source address (+relying on ingress filtering as discussed above), based on the message being protected with IPSec, or by some other means.

If possible, the new access router should check that the message is fresh, i.e., not a replayed message. Whether this is possible depends mainly on how the message was relayed by the old access router. For example, if the message is protected with IPSec, IPSec sequence number protection gives enough assurance that no-one (except perhaps the old access router) has replayed the message.

If the routing prefix used on the old link is known (based on the old access router identity), it checks that the routing prefix in the old care-of-address matches with this routing prefix.

It checks that the old care-of-address corresponds with the public key and the CGA parameters in the forwarded message.

Optionally, it verifies the signature.

It should be noted that this method requires resources and adds protection only in the case where the old access router cannot be fully trusted, either because it is impossible to implement trustworthy packet classification based on the tunnel source address (due to lack of ingress filtering), or because the mobile node is somehow known and trusted more than the old access router. If the old access router is trusted to send tunnelled packets only if there is a mobile node that is likely to appear on the new link, the first such tunnelled packet implicitly contains an indication that more such packets are likely to come, and that the mobile node is likely to appear. However, such a tunnelled message does not contain the CGA parameters or signature. Thus, the additional protection provided by this method is limited.

CGA alone does not add much value, since anyone can generate a new CGA addresses. Similarly, the signature only adds an assurance that the mobile node (as identified by the public key) has (once) intended to move from the old access link to the new one. However, the signature does not add any value unless the mobile node is somehow more trusted than the old access router, or unless the combined claims by the mobile node and the old access router is considered to be more valuable than the claim alone by the old access router.

In summary, the value of passing the forwarding setup messages, and using them to control resource allocation for queuing resources at the new access router, depends on the exact trust model and underlying security assumptions.

The base protocol uses only one message, the forwarding setup message, sent by the mobile node to the old access router, either proactively or reactively. The message consists of an IPv6 header, public key protected IPSec AH header, and a new ICMP message as illustrated in FIG. 4. The AH header contains the public key, signature, and CGA parameters. Note that, as discussed below, the source address of the packet may be either the old or the new care-of address. In either case, the CGA signature and parameters are valid.

The new ICMP Forwarding Tunnel creation message contains the nonce, the identity of the new access router, and the old care-of-address. In the proactive case, this address must be identical to the source address. In the reactive case, the source address is the new care-of-address. The new ICMP message contents are depicted in FIG. 5.

The IP fields are as follows:
Source Address: Either the old or the new care-of-address of the mobile node.
An address that belongs to the old access router.
ICMP fields: Type
TBD: To be assigned by IANA>for forwarding setup.

Code: 0
Checksum: ICMP checksum
Identifier A 16 bit unsigned integer that is an identifier to help match forwarding setup messages and acknowledgements, as explained further below.
Reserved: Unused. It MUST be initialised to zero by the sender and MUST be ignored by the receiver.
Mandatory options:
    Nonce: Nonce option as defined in [Arkko, J., "SEcure Neighbor Discovery (SEND)", draft-ietf-send-ipsec-00 (work in progress), February 2003].
    Access Router Identification: Used to identify the new access router. TBD.
Other options:
    Care-of-address: Contains the old care-of-address of the mobile node. TBD. This option MUST be used in the reactive case.
    Certificate: Certificate option, as defined in [Arkko, J., "SEcure Neighbor Discovery (SEND)", draft-ietf-send-ipsec-00 (work in progress), February 2003].

Considering now the proactive mobile node, this mobile node performs the following operations:
    It listen to the nonces broadcast by the old access router. It would be logical to include the nonces into the Router Advertisement message.
    It detects that it (that is the mobile node) is likely to move to a new access router in the very near future, and determines the (likely) identity of that access router.
    It creates an ICMP Forwarding Tunnel creation message, using the current care-of-address as the source address and the old access router's IP address as the destination address, containing a fresh message identifier number, the most recently received nonce, and the (likely) identity of the new access router.
    It wraps the message into an AH header, including the public key of the mobile node, the CGA parameters used, and a signature over all of the packet
    It sends the message to the old access router.
    Once the mobile node detects that it has indeed moved, and assuming that the new care-of-address is the default one, it start accepting forwarded packets from the old access router.

In the case of the reactive mobile mode, the mobile node performs the following operations:
    It listen to the nonces broadcast by the old access router. Again, it is logical to include the nonces into Router Advertisement message.
    It detects that it has moved to a new access router.
    It creates an ICMP Forwarding Tunnel creation message, using the current car-of-address as the source address and the old access router's IP address as the destination address, containing a fresh message identifier number, the most recently received nonce, and the identity (routing prefix) of the new access router, and the old care-of-address.
    It wraps the message into an AH header, including the public key of the mobile node, the CGA parameters used, and a signature over all of the packet.
    It sends the message to the old access router.
    It starts accepting forwarded packets from the old access router.

The old access router has two independent functions: packet queuing and forwarding creation. Packets are queued only prior to forwarding tunnel creation.

If the old access router detects that a mobile node has become unreachable without creating a forwarding tunnel, it may start queuing packets sent to the old care-of-address, resources permitting. The queued packets should be held only for a limited time. The maximum queuing time is a configuration option, whose value should not exceed 10 seconds. If there are less resources available than would be needed to queue all packets for the maximum time, the router may drop queued packets. The dropping algorithm is a local implementation option.

When the old access router receives an ICMP Forwarding Tunnel creation message, it first performs the following operations, in some implementation dependent order:

It checks that the message is targeted to the right node. This is usually automatically performed by the IP layer.

It checks that the nonce in the ICMP option is fresh, i.e., either the most recently broadcast one or the one immediately before that. If it is not, it silently drops the message.

It extracts the old care-of-address either from the source address field in the IP header, or from the ICMP old care-of-address option.

It check that the routing prefix in the old care-of-address matches with the routing prefix used on the old link. If it does not, it silently drops the message.

It checks if there is still a neighbour cache entry for the old care-of-address. If there is no such neighbour cache entry, the procedure continues to the next step. If there is such an entry and if the message was received from the old care-of-address, it optionally verifies that the source MAC address matches with the one in the neighbour cache entry. If it does not, it drops the packet. If the message was received from some other IP address, it triggers Neighbour Unreachability Detection (NUD) towards the node described in the neighbour cache entry. If NUD shows that the node is unreachable, the procedure continues, otherwise the message is dropped.

It verifies that the old care-of-address is correctly constructed from the public key and the CGA parameters. In the proactive case, this step is may be performed as a part of AH processing. If the verification fails, the message is silently dropped.

It verifies the signature. In the proactive case, this step is typically performed as a part of AH processing. If the verification fails, the message is silently dropped.

It verifies that the given identity of the new access router is a valid one. The purpose of this step is to protect innocent networks against malicious mobile nodes that create forwarding tunnels whose other end-point is a bogus one.

Note that the order in which the operations are performed may differ from one implementation to another. However, the order above is believed to be more denial-of-service resistant than many of the other possible orders.

After verifying the messages, the access router initiates forwarding, as follows:

It computes the new care-of-address using the routing prefix of the new access router, the public key of the mobile node, and the CGA parameters.

If the ICMP Forwarding Tunnel creation message was not received from the old care-of-address, it checks that the IP source address in the message matches with the computed new care-of-address. If it does not, it drops the message, logs a warning, and does not create the tunnel.

If the ICMP Forwarding Tunnel creation message was received from the old care-of-address, it optionally waits for the mobile node to become unreachable.

It starts forwarding all packets whose destination address is the old care-of-address. It wraps such packets into an tunnel header whose source address is an IP address of the old access router, and the destination address the new care-of-address, and passes these packets back to the wireline network, to be delivered to the new access router. If there are any queued packets, destined to this old care-of-address, it passes those packets first At the same time, it starts forwarding tunnelled packets whose outer source address is the new care-of-address and destination address is the old access router. When unwrapping these message, the old access router MUST verify that that the inner source address matches with the old care-of-address. This effectively creates a reverse tunnel, allowing the mobile node to send packets with its old care-of-address.

In addition to its normal operations, the only thing that the new access router needs to do is queuing in the proactive case. Other than that, the new access router acts as an access muter just like before. Note, however, that most access routers will act both in the old access router and new access router roles, often simultaneously. This must be taken care of in the implementation.

The new access router may initiate queuing when it receives a forwarded packet, destined to a local address that does not have a neighbour cache entry. To be more specific, the new access router acts as follows:

As the access router receives packets from the wireline network, it inspects its neighbour cache, and if there is a neighbour cache entry corresponding to the destination address, it delivers the packet.

If there is no corresponding neighbour cache entry, the access router initiates neighbour discovery procedure as defined in RFC2461.

If the access router has resources available for queued packets, the access router next inspects the packet more carefully, classifying it based on its header. While the exact classification criteria are implementation specific, the following criteria are suggested:

If the packet is a forwarded one, and the outer source address belongs to a known (and trusted) access router, the packet is given a higher queuing priority than otherwise.

If the tunnel header is integrity protected (e.g. ESP tunnel mode), the packet is given higher queuing priority than if the tunnel header is not integrity protected.

Any queued packets should be dropped after a while. The maximum queuing time is a configuration parameter, whose value should not exceed 10 seconds.

If there are less resources available than would be needed to queue all received packets for the maximum time, there is no other option than to drop some packets. The dropping algorithm is a local implementation option.

If a new neighbour cache entry is created, the queues are checked to see if there are any packets destined to that address. If there are, the queued packets are immediately delivered.

In this section we briefly describe some variations of the base method. The variations are described by explaining how they differ from the base method.

Using Certificates Instead of CGA

It may be useful to use certificates instead of CGA. In this case all the participating access routers must have a common trusted third party (or a set of such parties) that issue certificates. Each mobile node must have such a certificate, and the certificate must include the mobile node's public key and interface identifier. For instance, network interface cards might contain a key pair and certificate issued by the manufacturer for the MAC address of the card. Instead of computing the interface identifiers dynamically, as per CGA, the interface identifiers are static in this method. A care-of-address is simply formed by concatenating the routing prefix and the interface identifier, as given in the certificate. However, for privacy purposes it is also possible to use some cryptographic derivative of the routing prefix and the original interface identifier as the interface identifier. For example, one can compute a hash function over the routing prefix and the original interface identifier, and then use bits from the hash function result as the actual interface identifier.

Instead of passing the CGA parameters in the AH header, the mobile node must pass the certificate as an ICMP option. Also, instead of verifying that the address matches with the public key and CGA parameters, the old access router verifies that the interface identifier matches with the one given in the certificate. Additionally, the old access router must verify the signature in the certificate and make sure that the certificate issuer is trusted in the context.

Forwarding Packets to Several New Links

Instead of proactively forwarding the packets to the most likely new access router, the old access router may simultaneously tunnel the packets to several likely new access routers. This is possible, for example, if the access routers share topological and geographical information, allowing them to "guess" what are the most likely nearby access routers that the mobile node is likely to arrive. It must be noted that this method uses more resources than other methods as the old access router will create multiple copies of the packets, and the packets will be tunnelled at several possible new access routers. This method may be enhanced by the mobile node sending a reactive Forwarding tunnel creation message once it has arrived at the actual new link, allowing the old access router to cease forwarding the packets to all but the actual new access router.

Autonomous Forwarding Setup

Autonomous tunnel set up by the old access router is possible if the old access router is able to detect when the mobile node has left and the old access router is able to guess, with a high enough probability, the likely new access router (or routers) that the mobile node is going to use. In autonomous forwarding setup, neither CGA addresses nor certificates are typically needed. It is sufficient for the access routers to share a security association. Resources permitting, the old access router may be able to use a group of likely new access routers instead of a single one, and start forwarding packets to all of these. However, this takes more resources than otherwise is needed.

Supporting Explicit QoS Classes in Queuing

In the base method it is suggested that the packets are queued equally, with the possible exception of the new access router classifying packets based on what kind of tunnelling header they have. However, if is possible to use quality-of-service classification on the packets, and adjust the queuing algorithms appropriately.

Unwrapping the Tunnel Header at the New Access Router

It is possible to enhance the performance of the access link at the new access router by removing the tunnel header at the new access router. The new access router would just send the packet to the MAC address of the mobile node, but still keep the old care-of-address as the source address.

Various Acknowledgement Messages

In the base method the mobile node simply sends the ICMP Forwarding Tunnel creation message. There are no acknowledgement messages. There are two reasons for this. Firstly, it keeps the method simple. Secondly, in the proactive case it is unlikely that the mobile node would be able to receive an acknowledgement before it moves, and in the reactive case starting to receive forwarded messages acts as an implicit acknowledgement. Thus, from a practical point of view, adding acknowledgements does not add much value to the protocol. It is certainly possible however, to add acknowledgement messages to the protocol. The message identifier field in the ICMP message allows the acknowledgements and forwarding tunnel creation requests to be matched with each other. We don't see any reason to explicitly protect the acknowledgements, since they are informational; i.e., they do not create any actual state.

Using Old Care-of-address as Source Address in Reactive Case

In the base method, the reactive ICMP Forwarding Tunnel creation message is sent using the new care-of-address as the source address in the IP header. However, if the network allows the mobile node to use the old care-of-address even in the reactive case, that would simplify processing at the old access router. Technically, there is no reason why the old care-of-address could not be used; the question is purely whether the possible source address filters in the network would pass the packet all the way through from the new link to the old access router.

Simplifications with Host Identity Protocol (HIP)

If the method is used together with the Host Identity Protocol (HIP), the tunnel header can be replaced with simple IP address rewriting. That is, the old care-of-address in the destination field in the IP header is simply replaced with the new care-of-address. Since HIP uses HITs in upper layer checksums instead of IP addresses, the replacement does not affect upper layer protocols. However, the new access router may need to be more careful with its queue classification algorithms.

There is one case where the present method may yield non-optimal performance. If the mobile node performs proactive forwarding tunnel creation, the tunnelled packets are queued at the new access router. This is based on the assumption that this will lead to faster packet delivery once the mobile node arrives to the new link. However, it is possible that the new access router has no or less queuing resources at its disposal than the old access router has. In that specific case, it would yield better performance if the packets were queued at the old access router instead of the new one. However, including such as scheme in the present method would be an engineering solution that would improve performance in a rarely occurring case, at the cost of much higher complexity and state requirements.

The invention claimed is:

1. A method of forwarding IP packets, sent to an old care-of-address of a mobile node, following a handover of the mobile node from a first access router to a second access router, the method comprising:
   prior to completion of said handover, providing said first access router or proxy node with information necessary to determine a new IP care-of-address to be used by the mobile node when the mobile node is transferred to the second access router;
   at said first access router or said proxy node, determining the new care-of-address for the mobile node using said information, and confirming ownership of the new care-of-address by the mobile node by;
      using the public key of a public-private key pair belonging to the mobile node to generate the new care-of-address.

generating a signed message at the mobile node with the private key, and sending that signed message to the first access router; and subsequently forwarding packets received at said first access network and destined for said old care-of-address, to the new care-of-address, wherein the second access router verifies the relevance of tunnel set-up requests by periodically sending a nonce to listening mobile nodes, said mobile node hearing this nonce when the mobile node scans for a new link and including the nonce in the mobile node's notification to the first access router, the first access router including the nonce in the tunnel set-up message.

2. The method according to claim 1, wherein said proxy node acts as an Internet Protocol level proxy for the mobile node, causing said first access router to believe that the mobile node has not yet moved.

3. The method according to claim 1, wherein said step of determining a new care-of-address for the mobile node comprises predicting the new care-of-address on the basis of one or more components.

4. The method according to claim 3, wherein said step of predicting the new care-of-address is carried out in response to the mobile node notifying the first router or proxy node that it has moved or is about to move.

5. The method according to claim 4, further comprising the mobile node sending the notification to the first access router from the link attached to the second access router.

6. The method according to claim 4, wherein the first access router or proxy node confirms the timeliness of said notification prior to forwarding packets to the new care-of-address.

7. The method according to claim 6, further comprising the step of determining the timeliness of said notification using a nonce periodically sent by the first access router and echoed back in the notification.

8. The method according to claim 1 and comprising the step of queuing, at the second access router, IP packets forwarded from the first access router until the mobile node appears on the new link and the necessary address resolution and other procedures have been completed to ensure that the second access router and the mobile node can exchange packets.

9. The method according to claim 8, wherein a queue is established for the mobile node at an access router depending upon the trust relationship existing between that access router and the other access router and/or the mobile node.

10. The method according to claim 9, wherein the maximum size of the queue depends upon said trust relationship (s).

11. The method according to claim 1 and comprising the step of queuing, at the first access router, packets destined to the mobile node's old care-of-address until the first access router is able to determine the new care-of address of the mobile node.

12. The method according to claim 1, wherein said step of predicting the new care-of-address is probabilistic and may fail.

13. The method according to claim 1, wherein said procedure makes use of certificates.

14. The method according to claim 1, wherein said new care-of-address is one of a plurality of care-of addresses predicted by the first access router, the first access router forwarding packets to each of the predicted care-of-addresses.

15. The method according to claim 1 further comprising, following the prediction of the new care-of-address by the first access router or the proxy node, sending a tunnel set-up request from the first router to the second access router, and subsequently forwarding packets through the established tunnel.

16. An access router for use in a packet switched access network the access router comprising:

means for determining a future care-of-address for a mobile terminal currently or recently attached to the access router and for confirming ownership of the new care-of-address by the mobile node, wherein said new care-of-address is one of a plurality of care-of-addresses predicted by the first access router, the first access router forwarding packets to each of the predicted care-of-addresses; and means for forwarding packets sent to the mobile terminal, at a care-of-address associated with the access router, to said care-of address, wherein the second access router verifies the relevance of tunnel set-up requests by periodically sending a nonce to listening mobile nodes, said mobile node hearing this nonce when it scans for a new link and including it in its notification to the first access router, the first access router including the nonce in the tunnel set-up message.

17. The access router according to claim 16 and comprising means for establishing a tunnel between the access router and a second access router associated with the predicted future care-of-address.

18. A mobile node for receiving IP packets, sent to an old care-of-address of the mobile node following a handover of the mobile node from a first access router to a second access router, comprising:

means for providing said first access router or proxy node with information necessary to determine a new IP care-of-address to be used by the mobile node, prior to completion of said handover when the mobile node is transferred to the second access router, wherein said new care-of-address is one of a plurality of care-of-addresses predicted by the first access router, the first access router forwarding packets to each of the predicted care-of-addresses;

means for, at said first access router or said proxy node, determining the new care-of-address for the mobile node using said information, and confirming ownership of the new care-of-address by the mobile node; and means for subsequently forwarding packets received at said first access network and destined for said old care-of-address, to the new predicted care-of-address, wherein the second access router verifies the relevance of tunnel set-up requests by periodically sending a nonce to listening mobile nodes, said mobile node hearing this nonce when it scans for a new link and including it in its notification to the first access router, the first access router including the nonce in the tunnel set-up message.

19. The mobile node according to claim 18, wherein said proxy node acts as an Internet Protocol level proxy for the mobile node, causing said first access router to believe that the mobile node has not yet moved.

20. The mobile node according to claim 18, wherein the means for determining a new care-of-address for the mobile node includes means for predicting the new care-of-address on the basis of one or more components.

21. The mobile node according to claim 20, wherein the means for predicting the new care-of-address begins the prediction process in response to the mobile node notifying the first router or proxy node that it has moved or is about to move.

22. The mobile node according to claim 21, further comprising means associated with the mobile node for sending the notification to the first access router from the link attached to the second access router.

23. The mobile node according to claim 21 wherein the first access router or proxy node confirms the timeliness of said notification prior to forwarding packets to the new care-of-address.

24. The mobile node according to claim 23 further comprising means for determining the timeliness of said notification using a nonce periodically sent by the first access router and echoed back in the notification.

25. The mobile node according to claim 18 comprising means for queuing, at the second access router, IP packets forwarded from the first access router until the mobile node appears on the new link and the necessary address resolution and other procedures have been completed to ensure that the second access router and the mobile node can exchange packets.

26. The mobile node according to claim 25, further comprising means for establishing a queue for the mobile node at an access router depending upon the trust relationship existing between that access router and the other access router and/or the mobile node.

27. The mobile node according to claim 26, wherein the maximum size of the queue depends upon said trust relationship(s).

28. The mobile node according to claim 18 comprising means for queuing, at the first access router, packets destined to the mobile node's old care-of-address until the first access router is able to determine the new care-of-address of the mobile node.

29. The mobile node according to claim 18, wherein said means for predicting the new care-of-address is probabilistic and may fail.

30. The mobile node according to claim 18, wherein the means for predicting the new care-of-address comprises means for applying a procedure which is known and understood by mobile nodes and access routers.

31. The mobile node according to claim 30, wherein said procedure uses cryptographically generated addresses.

32. The mobile node according to claim 31, wherein the means for determining a new care-of-address comprises using a public key of a public-private key pair belonging to the mobile node to generate the new care-of-address, and the means for confirming ownership of the new care-of-address by the mobile node comprises means for generating a signed message at the mobile node with the private key, and sending that signed message to the first access router.

33. The mobile node according to claim 18, further comprising means for following the prediction of the new care-of-address by the first router or the proxy node, sending a tunnel set-up request from the first router to the second router, and subsequently forwarding packets through the established tunnel.

* * * * *

UNITED STATES PATENT AND TRADEMARK OFFICE
CERTIFICATE OF CORRECTION

PATENT NO. : 7,535,870 B2  Page 1 of 1
APPLICATION NO. : 10/558498
DATED : May 19, 2009
INVENTOR(S) : Nikander et al.

It is certified that error appears in the above-identified patent and that said Letters Patent is hereby corrected as shown below:

In Column 1, Line 44, delete "muter" and insert -- router --, therefor.

In Column 5, Line 2, delete "link" and insert -- link, --, therefor.

In Column 11, Line 43, delete "nodes" and insert -- node's --, therefor.

In Column 14, Line 3, after "Identifier" insert -- : --.

In Column 16, Line 15, delete "muter" and insert -- router --, therefor.

In Column 17, Line 38, delete "left" and insert -- left, --, therefor.

In Column 18, Line 64, in Claim 1, delete "by;" and insert -- by: --, therefor.

In Column 18, Line 67, in Claim 1, delete "address." and insert -- address, --, therefor.

Signed and Sealed this

Seventeenth Day of November, 2009

David J. Kappos
*Director of the United States Patent and Trademark Office*